United States Patent
Xiao et al.

(10) Patent No.: US 10,454,817 B2
(45) Date of Patent: Oct. 22, 2019

(54) METHOD AND DEVICE FOR PROCESSING GR OF OPENFLOW SWITCH, AND OPENFLOW CONTROLLER

(71) Applicant: ZTE Corporation, Shenzhen (CN)

(72) Inventors: Min Xiao, Shenzhen (CN); Liang Fan, Shenzhen (CN); Ran Chen, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 50 days.

(21) Appl. No.: 15/120,388

(22) PCT Filed: Jul. 22, 2014

(86) PCT No.: PCT/CN2014/082754
§ 371 (c)(1),
(2) Date: Aug. 19, 2016

(87) PCT Pub. No.: WO2015/123962
PCT Pub. Date: Aug. 27, 2015

(65) Prior Publication Data
US 2017/0070424 A1    Mar. 9, 2017

(30) Foreign Application Priority Data
Feb. 21, 2014 (CN) .......................... 2014 1 0060276

(51) Int. Cl.
*H04L 12/721* (2013.01)
*H04L 12/64* (2006.01)
*H04L 12/755* (2013.01)

(52) U.S. Cl.
CPC .......... *H04L 45/38* (2013.01); *H04L 12/6418* (2013.01); *H04L 45/021* (2013.01)

(58) Field of Classification Search
CPC ..... H04L 12/6418; H04L 45/021; H04L 45/38
See application file for complete search history.

(56) References Cited

U.S. PATENT DOCUMENTS 9,590,901 B2 *   3/2017   Tubaltsev ............. H04L 45/586
2006/0171404 A1  8/2006   Nalawade
(Continued)

FOREIGN PATENT DOCUMENTS

CN     101026473 A     8/2007
CN     101179446 A     5/2008
(Continued)

OTHER PUBLICATIONS

International Search Report for corresponding application PCT/CN2014/082754 filed on Jul. 22, 2014; dated Nov. 26, 2014.
(Continued)

*Primary Examiner* — Khaled M Kassim
*Assistant Examiner* — Syed Ali
(74) *Attorney, Agent, or Firm* — Cantor Colburn LLP (57) ABSTRACT

Provided are a method and device for processing a Graceful Restart (GR) of an OpenFlow switch, and an OpenFlow controller. The method includes that: the OpenFlow switch is determined being in a GR state; and the state of the OpenFlow switch is marked as the GR state, wherein marking the state as the GR state includes: keeping a flow table and external connection of the OpenFlow switch before GR still valid, and prohibiting the flow table from being modified. Through the present disclosure, the problem in the related art that GR of an OpenFlow switch cannot be achieved is solved, thereby achieving the effect of effectively implementing the GR of the OpenFlow switch.

9 Claims, 9 Drawing Sheets

(56) References Cited

U.S. PATENT DOCUMENTS

| | | | | |
|---|---|---|---|---|
| 2011/0271007 | A1* | 11/2011 | Wang | H04L 45/306 |
| | | | | 709/238 |
| 2011/0286324 | A1* | 11/2011 | Bellagamba | H04L 41/0677 |
| | | | | 370/219 |
| 2012/0102080 | A1 | 4/2012 | Kirihata et al. | |
| 2013/0114615 | A1* | 5/2013 | Suemitsu | H04L 47/2441 |
| | | | | 370/401 |
| 2013/0170435 | A1* | 7/2013 | Dinan | H04L 45/50 |
| | | | | 370/328 |
| 2014/0003227 | A1* | 1/2014 | Scudder | H04L 45/021 |
| | | | | 370/218 |
| 2014/0173133 | A1* | 6/2014 | Ammireddy | H04L 45/02 |
| | | | | 709/241 |
| 2015/0149656 | A1* | 5/2015 | McMurry | H04L 45/00 |
| | | | | 709/238 |
| 2015/0154494 | A1* | 6/2015 | Medvedovsky | G06N 5/04 |
| | | | | 706/46 |
| 2015/0169457 | A1* | 6/2015 | Jackson | G06F 12/121 |
| | | | | 711/135 |
| 2015/0195178 | A1* | 7/2015 | Bhattacharya | H04L 45/745 |
| | | | | 718/1 |
| 2016/0173338 | A1* | 6/2016 | Wolting | H04L 41/145 |
| | | | | 709/223 |
| 2016/0380899 | A1* | 12/2016 | Lee | H04L 47/20 |
| | | | | 370/235 |
| 2018/0300244 | A1* | 10/2018 | Jackson | G06F 12/0895 |

FOREIGN PATENT DOCUMENTS

| | | |
|---|---|---|
| CN | 101984600 A | 3/2011 |
| CN | 102281199 A | 12/2011 |
| WO | 2010043234 A1 | 4/2010 |
| WO | 2013108761 A1 | 7/2013 |

OTHER PUBLICATIONS

A. Komiyama, "Network World", Aug. 2017, 4 pages.

CN Search Report dated Mar. 22, 2018, CN Application No. 2014100602769, 1 page.

JP Office Action dated Mar. 20, 2018, JP Application No. 2016-553456, 4 pages.

Extended European Search Report dated Nov. 2, 2015 re: Application No. 13846907.7-1853/2911063 PCT/CN203/081396; pp. 1-7; citing: WO 20110/043234 A1 and US 2012/102080 A.

* cited by examiner

METHOD AND DEVICE FOR PROCESSING GR OF OPENFLOW SWITCH, AND OPENFLOW CONTROLLER

TECHNICAL FIELD

The present disclosure relates to the field of communications, and in particular to a method and device for processing a Graceful Restart (GR) of an OpenFlow switch, and an OpenFlow controller.

BACKGROUND

In a data communication network, a network element device will be frequently restarted due to various reasons such as software reinstallation or upgrade, software failure or primary-standby switching of a processor running control software. Restart of the network element device may be divided into two classes: a first class of restart, which may cause failure of a forwarding function of the network element device along with the restart of the control software, will inevitably trigger re-convergence of a forwarding route in a network and will affect a service traffic in the network accordingly; and a second class of restart, which can ensure that the forwarding function of the network element device keeps normally running in a restart process of the control software, will not inevitably trigger re-convergence of the forwarding route in the network and will not affect the service traffic in the network accordingly.

In view of the second class of restart, in order to avoid re-convergence of the forwarding route in the network, it is necessary to make some extensions on basic routing protocols such as an Open Shortest Path First (OSPF) protocol, an Intermediate System to Intermediate System (IS-IS) protocol and a Border Gateway Protocol (BGP), and to add corresponding protocol messages and protocol flows. A non-stop forwarding restart process implemented by the network element device supporting these protocol extensions is called as GR. The international standard organization Internet Engineering Task Force (IETF) released RFC 3623 in November, 2003 and RFC 5187 in June, 2008 respectively, and specified how to extend the OSPF protocol so as to support GR of a network element device running the OSPF protocol. The IETF released RFC 5306 in October, 2008, and specified how to extend the IS-IS protocol so as to support GR of a network element device running the IS-IS protocol. The IETF released RFC 4724 in January, 2007, and specified how to extend the BGP so as to support GR of a network element device running the BGP.

Figure 1:
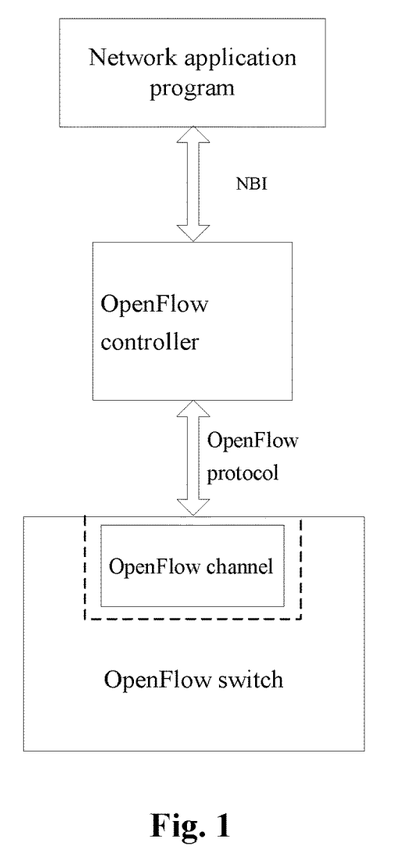
FIG. 1 is an architecture diagram of an OpenFlow network component according to the related art.

With the proposal of a concept of Software Defined Network (SDN) and the development of an application of the SDN, an OpenFlow technology serving as an SDN core technology is in a rapid development stage, and an OpenFlow network constructed using the OpenFlow technology currently has been more and more applied to actual production and living. An OpenFlow network adopts an architecture where a control plane and a forwarding plane (also called as a data plane or a user plane) are separated. FIG. 1 is an architecture diagram of an OpenFlow network component according to the related art. As shown in FIG. 1, the control plane of the OpenFlow network is implemented by an OpenFlow controller, the OpenFlow controller is a device having a powerful computing capability, and a specific form of the device may be a personal computer, a server or a server cluster. The forwarding plane of the OpenFlow network is implemented by an OpenFlow switch, the OpenFlow switch is a device having a powerful switching capability, and a specific form of the device is a network element device equipped with a plurality of network ports to process and forward a message based on a flow table. A network application program is App software similar to an App running on a terminal device such as a mobile phone and a tablet computer, and is configured to complete deployment and/or modification of a certain network service. An interface between the OpenFlow controller and the OpenFlow switch runs an OpenFlow protocol, and the network application program may call the OpenFlow controller via a Northbound Interface (NBI) so as to achieve operations on the OpenFlow network. The international standard organization Open Networking Foundation (ONF) is in charge of specifying and modifying the OpenFlow protocol and the NBI, and an OpenFlow switch specification 1.4.0 version formally released by the ONF in October, 2013 specifies an OpenFlow protocol flow and a message processing flow inside the OpenFlow switch. An OpenFlow switch specification specifies that when connection between the OpenFlow switch and the OpenFlow controller is interrupted, the OpenFlow switch will enter a fail secure mode or a fail standalone mode: the OpenFlow switch entering the fail secure mode still forwards a received service message according to the flow table and will directly discard the service message requiring to be sent to the OpenFlow controller; and the OpenFlow switch entering the fail standalone mode will forward the service message by adopting a non-flow table forwarding manner, namely utilizing a traditional forwarding table, and the fail standalone mode is merely applied to a hybrid network element device supporting both flow table forwarding and traditional forwarding table forwarding simultaneously. The above OpenFlow switch specification merely specifies a behaviour of the OpenFlow switch after the connection between the OpenFlow switch and the OpenFlow controller is interrupted, and due to lack of consideration of how to support GR of the OpenFlow switch, behaviour specifications of the OpenFlow switch and the OpenFlow controller before and after the GR of the OpenFlow switch are not provided. Consequently, once the OpenFlow switch is restarted and the interruption of the connection between the OpenFlow switch and the OpenFlow controller will to be triggered, the OpenFlow controller will delete the OpenFlow switch and all network connection of the OpenFlow switch from a self-stored network topology, thereby re-computing routes and update flow tables of all affected OpenFlow switches in the network. After the restart of the OpenFlow switch is completed and re-establishes an OpenFlow protocol connection with the OpenFlow controller, the OpenFlow controller will re-discover all network connections of the OpenFlow switch and add the network element device into the self-stored network topology, thereby re-computing routes and update flow tables of all affected OpenFlow switches in the network.

As a result, the problem that GR of an OpenFlow switch cannot be achieved exists in the related art.

SUMMARY

The present disclosure provides a method and device for processing a GR of an OpenFlow switch, and an OpenFlow controller, which are intended to at least solve the problem in the related art that GR of an OpenFlow switch cannot be achieved.

According to one aspect of the present disclosure, a method for processing a GR of an OpenFlow switch is provided, including: determining the OpenFlow switch being in a GR state; and marking a state of the OpenFlow switch as the GR state, wherein marking the state as the GR state includes: keeping a flow table and external connection of the OpenFlow switch before the GR still valid, and prohibiting the flow table from being modified.

In an example embodiment, determining the OpenFlow switch being in the GR state includes: receiving a GR notification message sent by the OpenFlow switch; and determining the OpenFlow switch being in the GR state according to the received GR notification message.

In an example embodiment, determining the OpenFlow switch being in the GR state includes: sending, when connecting with the OpenFlow switch, to the OpenFlow switch a message for inquiring whether the OpenFlow switch supports a capability of the GR; receiving a GR supporting capability response message fed back by the OpenFlow switch; and determining, when disconnecting from the OpenFlow switch, the OpenFlow switch being in the GR state according to the received GR supporting capability response message. In an example embodiment, after marking the state of the OpenFlow switch as the GR state, further including: feeding back the GR state of the OpenFlow switch to a network application program module requiring to know a network topology.

In an example embodiment, after marking the state of the OpenFlow switch as the GR state, further including: detecting a re-connection with the OpenFlow switch; and clearing the GR state of the OpenFlow switch.

In an example embodiment, after clearing the GR state of the OpenFlow switch, further including: feeding back an updated state obtained after clearing the GR state of the OpenFlow switch to the network application program module requiring to know the network topology.

According to another embodiment of the present disclosure, a device for processing a Graceful Restart (GR) of an OpenFlow switch is provided, including: a determination component, configured to determine the OpenFlow switch being in a GR state; and a marking component, configured to mark the state of the OpenFlow switch as the GR state, wherein marking the state as the GR state includes: keeping a flow table and external connection of the OpenFlow switch before the GR still valid, and prohibiting the flow table from being modified.

In an example embodiment, the determination component includes: a first receiving element, configured to receive a GR notification message sent by the OpenFlow switch; and a first determination element, configured to determine the OpenFlow switch being in the GR state according to the received GR notification message.

In an example embodiment, the determination component includes: a sending element, configured to send, when connecting with the OpenFlow switch, to the OpenFlow switch a message for inquiring whether the OpenFlow switch supports a capability of the GR; a second receiving element, configured to receive a GR supporting capability response message fed back by the OpenFlow switch; and a second determination element, configured to determine, when disconnecting from the OpenFlow switch, the OpenFlow switch being in the GR state according to the received GR supporting capability response message.

In an example embodiment, the device further including: a first feedback component, configured to feed back the GR state of the OpenFlow switch to a network application program module requiring to know a network topology.

In an example embodiment, the device further including: a detection component, configured to detect re-connection with the OpenFlow switch; and a clearing component, configured to clear the GR state of the OpenFlow switch.

In an example embodiment, the device further including: a second feedback component, configured to feed back an updated state obtained after clearing the GR state of the OpenFlow switch to the network application program module requiring to know the network topology.

According to another embodiment of the present disclosure, an OpenFlow controller is provided, which may include the device according to any one of the above contents.

By means of the present disclosure, the OpenFlow switch is determined being in a GR state; and the state of the OpenFlow switch is marked as the GR state, wherein marking the state as the GR state includes: keeping a flow table and external connection of the OpenFlow switch before GR still valid, and prohibiting the flow table from being modified. The problem in the related art that GR of an OpenFlow switch cannot be achieved is solved, thereby achieving the effect of effectively implementing the GR of the OpenFlow switch.

BRIEF DESCRIPTION OF THE DRAWINGS

The drawings illustrated herein are intended to provide further understanding of the present disclosure, and form a part of the present disclosure. The schematic embodiments and illustrations of the present disclosure are intended to explain the present disclosure, and do not form improper limits to the present disclosure. In the drawings.

DETAILED DESCRIPTION OF THE EMBODIMENTS

The present disclosure will be illustrated below with reference to the drawings and in conjunction with the embodiments in detail. It is important to note that the embodiments of the present disclosure and the characteristics in the embodiments can be combined under the condition of no conflicts.

Figure 2:
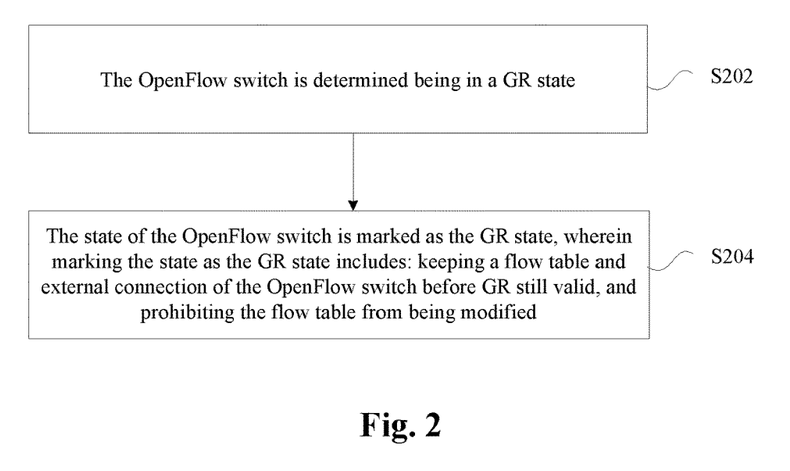
FIG. 2 is a flowchart of a method for processing a GR of an OpenFlow switch according to an embodiment of the present disclosure.

In the present embodiment, a method for processing a GR of an OpenFlow switch is provided. FIG. 2 is a flowchart of a method for processing a GR of an OpenFlow switch according to an embodiment of the present disclosure. As shown in FIG. 2, the flow includes the steps as follows.

Step S202: The OpenFlow switch is determined being in a GR state.

Step S204: The state of the OpenFlow switch is marked as the GR state, wherein marking the state as the GR state includes: keeping a flow table and external connection of the OpenFlow switch before the GR still valid, and prohibiting the flow table from being modified.

By means of the steps, when the OpenFlow switch is being the GR state, by marking the state of the OpenFlow switch as the GR state, the flow table and the external connection of the OpenFlow switch before GR are kept still valid and the flow table is prohibited from being modified within the period of restarting the OpenFlow switch. The problem in the related art that it is necessary to re-modify a network topology and to re-compute a network route during the restart of the OpenFlow switch thereby causing interruption of a service flow, namely the problem that GR of the OpenFlow switch cannot be achieved, is solved. By means of the above processing, the state being before the restart state is kept within the period of restarting the OpenFlow switch, that is, the network topology is not modified and the route is not re-computed, thereby achieving the effect of effectively implementing the GR of the OpenFlow switch.

The state of the OpenFlow switch may be determined as the GR state in multiple manners, for instance, the following manners: a GR notification message sent by the OpenFlow switch is received; and the OpenFlow switch being in the GR state is determined according to the received GR notification message. That is, the GR state of the OpenFlow switch is determined in an active notification manner of the OpenFlow switch. For another instance, the state of the OpenFlow switch may be determined as the GR state in the following manners: when connecting with the OpenFlow switch, a message for inquiring whether the OpenFlow switch supports a capability of the GR, is sent to the OpenFlow switch; a GR supporting capability response message fed back by the OpenFlow switch is received; and when disconnecting from the OpenFlow switch, the OpenFlow switch being in the GR state is determined according to the received GR supporting capability response message. That is, the GR state of the OpenFlow switch is determined in a manner that an OpenFlow controller actively inquires the state of the OpenFlow switch.

In an example embodiment, after the state of the OpenFlow switch is marked as the GR state, the GR state of the OpenFlow switch may be fed back to a network application program module requiring to know a network topology. After the state of the OpenFlow switch is marked as the GR state, when re-connection with the OpenFlow switch is detected, the GR state of the OpenFlow switch is cleared. In an example manner, after the GR state of the OpenFlow switch is cleared, an updated state obtained after clearing the GR state of the OpenFlow switch may be fed back to the network application program module requiring to know the network topology. By means of the above processing, the processing smoothness of the whole service flow is effectively achieved.

In the present embodiment, a device for processing a GR of an OpenFlow switch is further provided. The device is configured to implement the above embodiment and example implementations. Those which have been illustrated will not be elaborated herein. Just as a term 'component' used below, the combination of software and/or hardware with predetermined functions may be implemented. Although the device described by the following embodiment is better implemented by software, the implementation of hardware or the combination of software and hardware may be possible and conceived.

Figure 3:
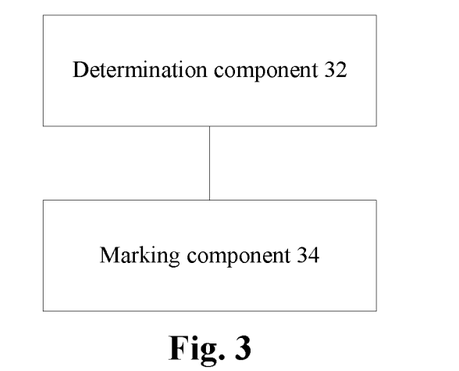
FIG. 3 is a structural diagram of a device for processing a GR of an OpenFlow switch according to an embodiment of the present disclosure.

FIG. 3 is a structural diagram of a device for processing a GR of an OpenFlow switch according to an embodiment of the present disclosure. As shown in FIG. 3, the device includes a determination component 32 and a marking component 34. The device will be illustrated below.

The determination component 32 is configured to determine the OpenFlow switch being in a GR state; and the marking component 32 is connected to the determination component 32, and is configured to mark the state of the OpenFlow switch as the GR state, wherein marking the state as the GR state includes: keeping a flow table and an external connection of the OpenFlow switch before the GR still valid, and prohibiting the flow table from being modified.

Figure 4:
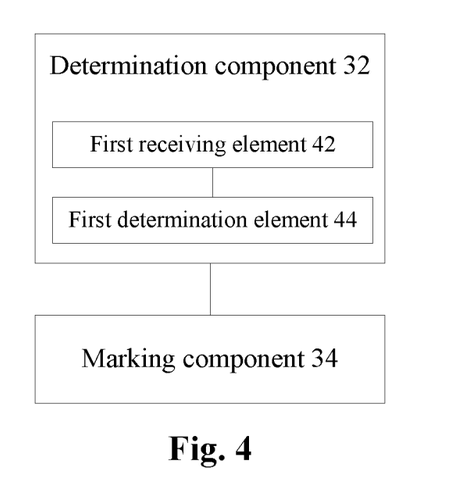
FIG. 4 is a first example structural diagram of the determination component 32 of the device for processing the GR of the OpenFlow switch according to an embodiment of the present disclosure.

FIG. 4 is a first example structural diagram of the determination component 32 of the device for processing the GR of the OpenFlow switch according to an embodiment of the present disclosure. As shown in FIG. 4, the determination component 32 includes a first receiving element 42 and a first determination element 44. The determination component 32 will be illustrated below.

The first receiving element 42 is configured to receive a GR notification message sent by the OpenFlow switch; and the first determination element 44 is connected to the first receiving element 42, and is configured to determine the OpenFlow switch being in the GR state according to the received GR notification message.

Figure 5:
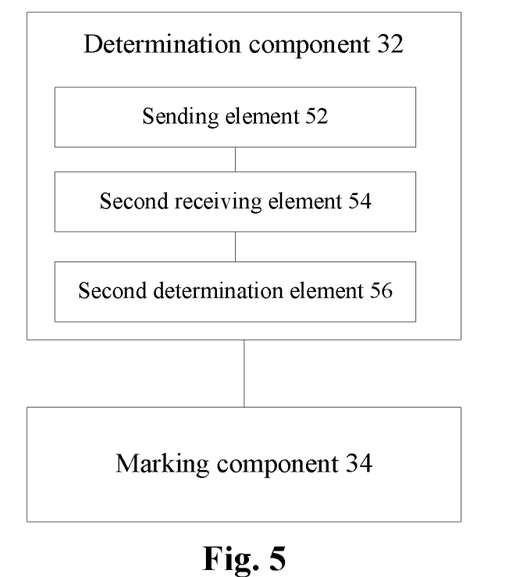
FIG. 5 is a second example structural diagram of a determination component 32 of the device for processing the GR of the OpenFlow switch according to an embodiment of the present disclosure.

FIG. 5 is a second example structural diagram of the determination component 32 of the device for processing the GR of the OpenFlow switch according to an embodiment of the present disclosure. As shown in FIG. 5, the determination component 32 includes: a sending element 52, a second receiving element 54 and a second determination element 56. The determination component 32 will be illustrated below.

The sending element 52 is configured to send, when connecting with the OpenFlow switch, to the OpenFlow switch a message for inquiring whether the OpenFlow switch supports a capability of the GR; the second receiving element 54 is connected to the sending element 52, and is configured to receive a GR supporting capability response message fed back by the OpenFlow switch; and the second determination element 56 is connected to the second receiving element 54, and is configured to determine, when disconnecting from the OpenFlow switch, the OpenFlow switch being in the GR state according to the received GR supporting capability response message.

Figure 6:
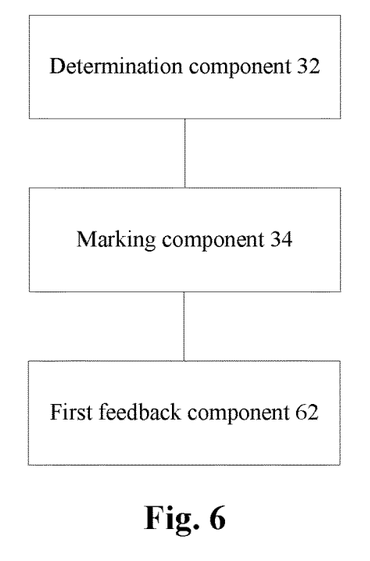
FIG. 6 is a first example structural diagram of the device for processing the GR of the OpenFlow switch according to an embodiment of the present disclosure.

FIG. 6 is a first example structural diagram of the device for processing the GR of the OpenFlow switch according to an embodiment of the present disclosure. As shown in FIG. 6, the device includes, in addition to all components shown in FIG. 3, a first feedback component 62. The first feedback component 62 will be illustrated below.

The first feedback component 62 is connected to the marking component 34, and is configured to feed back the GR state of the OpenFlow switch to a network application program module requiring to know a network topology.

Figure 7:
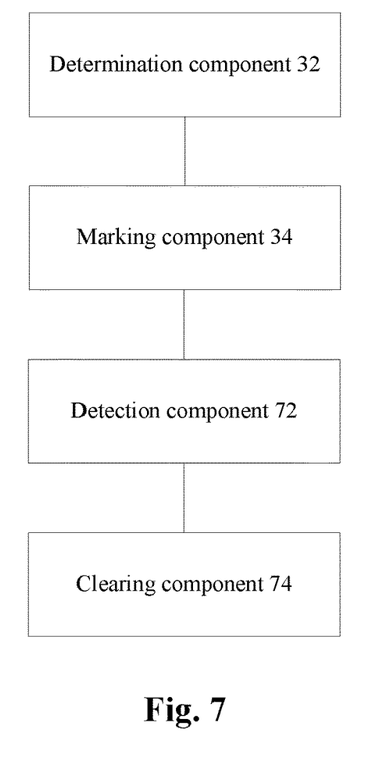
FIG. 7 is a second example structural diagram of the device for processing the GR of the OpenFlow switch according to an embodiment of the present disclosure.

FIG. 7 is a second example structural diagram of the device for processing the GR of the OpenFlow switch according to an embodiment of the present disclosure. As shown in FIG. 7, the device includes, in addition to all components shown in FIG. 3, a detection component 72 and a clearing component 74. The example structure will be illustrated below.

The detection component 72 is connected to the marking component 34, and is configured to detect re-connection with the OpenFlow switch; and the clearing component 74 is connected to the detection component 72, and is configured to clear the GR state of the OpenFlow switch.

Figure 8:
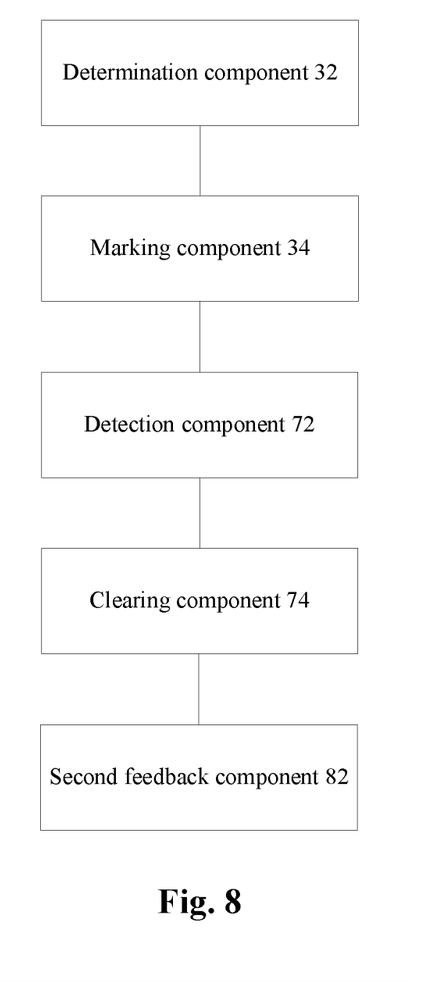
FIG. 8 is a third example structural diagram of the device for processing the GR of the OpenFlow switch according to an embodiment of the present disclosure.

FIG. 8 is a third example structural diagram of the device for processing the GR of the OpenFlow switch according to an embodiment of the present disclosure. As shown in FIG. 8, the device includes, in addition to all components shown in FIG. 7, a second feedback component 82. The second feedback component 82 will be illustrated below.

The second feedback component 82 is connected to the clearing component 74, and is configured to feed back an updated state obtained after clearing the GR state of the OpenFlow switch to the network application program module requiring to know the network topology.

Figure 9:
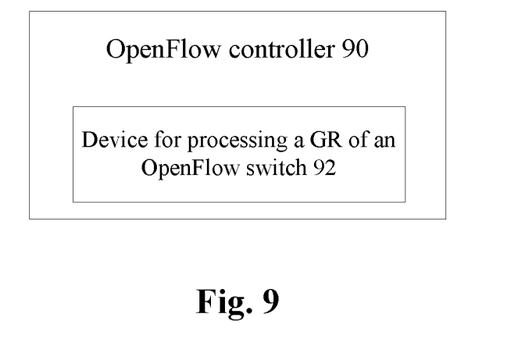
FIG. 9 is a structural diagram of an OpenFlow controller according to an embodiment of the present disclosure.

FIG. 9 is a structural diagram of an OpenFlow controller according to an embodiment of the present disclosure. As shown in FIG. 9, the OpenFlow controller 90 includes a device for processing a GR of an OpenFlow switch 92 according to any one of the above contents.

Aiming at the problem in the related art that GR of an OpenFlow switch cannot be achieved, a implementation method of a GR of an OpenFlow switch is provided in the present embodiment, such that the OpenFlow switch can complete GR which will not trigger interruption of a service traffic in an OpenFlow network, and overcome the defect in the related art that GR of the OpenFlow switch cannot be achieved. A method of a GR of an OpenFlow switch may be implemented in the manners as follows.

In the present implementation, an OpenFlow protocol specified by an ONF and an NBI are extended, a mechanism for sending a notification message to an OpenFlow controller before GR of the OpenFlow switch is added. After receiving the notification message, the OpenFlow controller will mark a state of the corresponding OpenFlow switch as a GR state in a self-stored network topology, and the GR state of the OpenFlow switch is fed back, via the NBI, to a network application program requiring to know the network topology. After the OpenFlow switch is completely restarted and re-establishes an OpenFlow protocol connection with the OpenFlow controller, the OpenFlow controller will clear the GR state of the corresponding OpenFlow switch in the self-stored network topology, and will feed back, via the NBI, a n updated state obtained after clearing the GR state of the OpenFlow switch to the network application program requiring to know the network topology. The GR of the OpenFlow switch is cooperatively implemented by extending the existing OpenFlow protocol and NBI. In an example embodiment, in the present embodiment, by extending the existing OpenFlow protocol, the OpenFlow controller may inquire a capability of the OpenFlow switch of whether the OpenFlow switch supports the GR, such that when the OpenFlow controller does not receive a GR notification message sent by the OpenFlow switch, the OpenFlow controller may still select to execute a flow which is specified by the present disclosure and executed after the GR notification message is received, thereby improving the flexibility of an OpenFlow controller implementation mode.

Example embodiments and example implementations of the present disclosure will be illustrated below in conjunction with the drawings.

Figure 10:
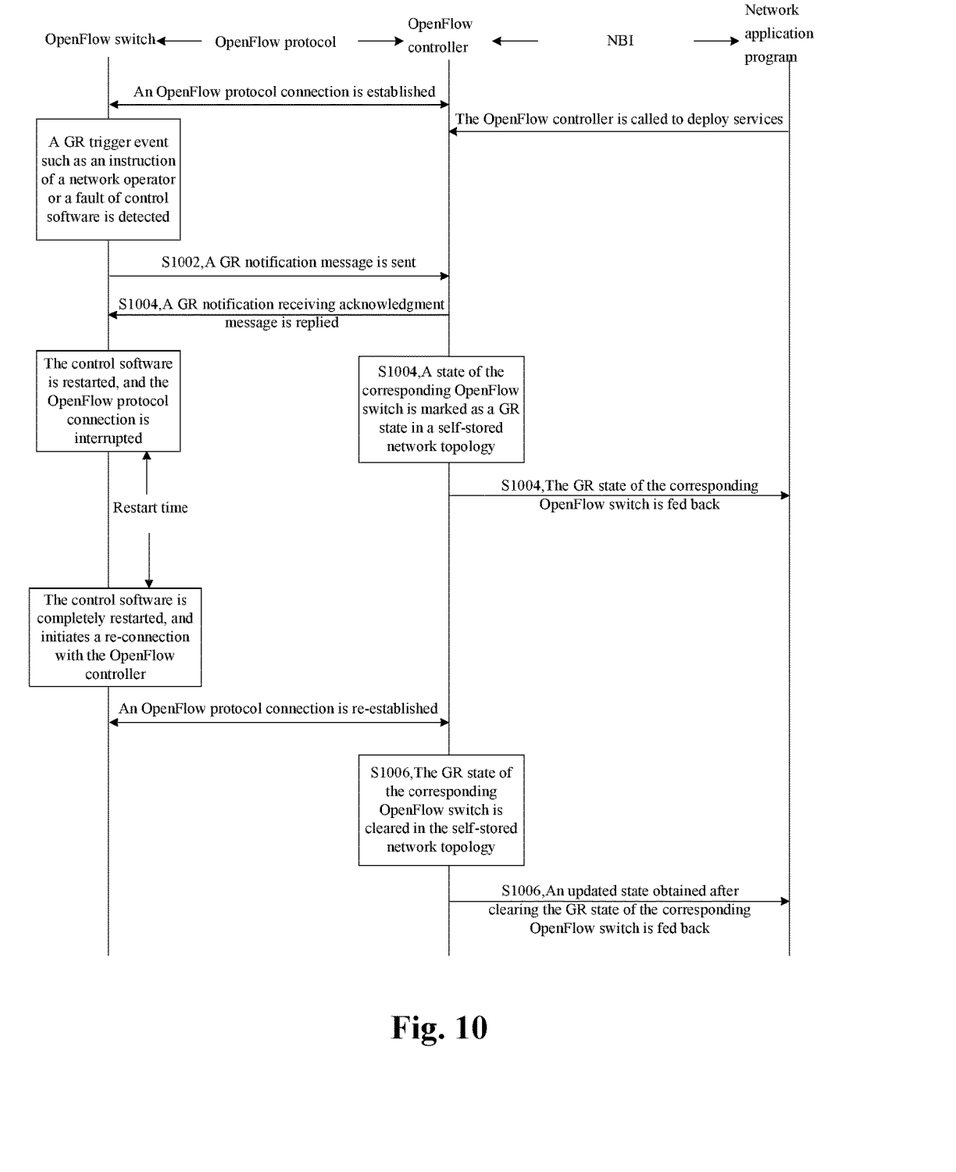
FIG. 10 is a flowchart of a first method for processing a GR of an OpenFlow switch according to an example embodiment of the present disclosure.

FIG. 10 is a flowchart of a first method for processing a GR of an OpenFlow switch according to an example embodiment of the present disclosure. As shown in FIG. 10, the flow includes the steps as follows.

Step S1002: After detecting a GR trigger event, an OpenFlow switch sends a GR notification message to an OpenFlow controller.

An OpenFlow protocol is run between the OpenFlow switch and the OpenFlow controller, and the GR notification message may be an OpenFlow protocol message packaged using an existing OpenFlow protocol, wherein the message is configured to notify the OpenFlow controller that the OpenFlow switch sending the message will perform a GR, and the message may be a newly defined OpenFlow protocol message or may be a new OpenFlow protocol message obtained by extending an existing OpenFlow protocol message.

The GR notification message may simultaneously carry a flag bit indicating that the OpenFlow switch will perform the GR, an identifier of the OpenFlow switch sending the message (an OpenFlow switch identifier (Datapath ID), namely a data path identifier, specified by an existing OpenFlow protocol may be adopted), a GR trigger event and maximum time needed by restart, wherein the GR trigger event includes an instruction of a network operator, a fault of control software, an upgrade of the control software, and the like; and the maximum time needed by restart is configured for the OpenFlow controller to judge whether the OpenFlow switch suffers from a restart fault, and is maximum waiting time within which the OpenFlow controller waits for the gracefully restarted OpenFlow switch to re-establish an OpenFlow protocol connection with the OpenFlow controller.

Step S1004: After receiving the GR notification message, the OpenFlow controller replies a GR notification receiving acknowledgement message to the OpenFlow switch, marks the state of the corresponding OpenFlow switch as the GR state in a self-stored network topology of the OpenFlow controller, and feeds back, via an NBI, the GR state of the corresponding OpenFlow switch to a network application program requiring to know the network topology.

The OpenFlow controller marks the state of an OpenFlow switch as the GR state. It is shown that an existing flow table and existing external connection of the OpenFlow switch are still valid and the OpenFlow controller does not be required to re-compute a route due to the restart of the OpenFlow switch and to modify flow tables of other OpenFlow switches in a network according to the re-computed route. It is also shown that the flow table of the OpenFlow switch is not able be modified temporarily, including that a new flow table is not able be added to the OpenFlow switch and the existing flow table of the OpenFlow switch is not able be deleted or changed.

Network application programs can be divided into two classes: the first class of network application programs does not required to know the network topology, and the second class of network application programs requires to know the network topology; the network application program requiring to know the network topology includes network management software used by a network provider, superior OpenFlow controller software used by a virtual operator renting a provider network, and the like; and after marking the state of an OpenFlow switch as the GR state, the OpenFlow controller requires to feed back, via the NBI, the GR state of the corresponding OpenFlow switch to the network application program requiring to know the network topology.

Step S1006: After the OpenFlow switch is completely restarted and re-establishes an OpenFlow protocol connection with the OpenFlow controller, the OpenFlow controller clears the GR state of the corresponding OpenFlow switch in the self-stored network topology, and feeds back, via the NBI, an updated state obtained after clearing the GR state of the OpenFlow switch to the network application program requiring to know the network topology.

After receiving a GR notification receiving acknowledgement message replied by the OpenFlow controller, the OpenFlow switch immediately performs software restart, the OpenFlow protocol connection between the OpenFlow switch and the OpenFlow controller will be immediately interrupted. Even if the GR notification receiving acknowledgement message replied by the OpenFlow controller is not received, the OpenFlow switch will perform software restart after waiting for a period of time thus causing interruption of the OpenFlow protocol connection between the OpenFlow switch and the OpenFlow controller.

After a period of restart time, the OpenFlow switch is completely restarted, and will immediately initiate and re-establish an OpenFlow protocol connection with the OpenFlow controller. Once the OpenFlow controller re-establishes the OpenFlow protocol connection with the OpenFlow switch, the OpenFlow controller will clear the GR state of the corresponding OpenFlow switch in the self-stored network topology, which means that the OpenFlow controller is able to re-control the OpenFlow switch and modify the flow table of the OpenFlow switch, including that a new flow table is able to be added to the OpenFlow switch and the existing flow table of the OpenFlow switch is able to be deleted or changed. Meanwhile, in order to make the network application program requiring to know the network topology acquire a latest network state, the OpenFlow controller will immediately feed back, via the NBI, an updated state obtained after clearing the GR state of the corresponding OpenFlow switch to the network application program requiring to know the network topology.

After the maximum time needed by restart, carried in the GR notification message sent to the OpenFlow controller by the OpenFlow switch, when the OpenFlow controller has not established an OpenFlow protocol connection with the OpenFlow switch yet, the OpenFlow controller will delete the OpenFlow switch and an external connection of the OpenFlow switch from the self-stored network topology according to the related art, and will feed back an updated network topology to the network application program requiring to know the network topology.

Figure 11:
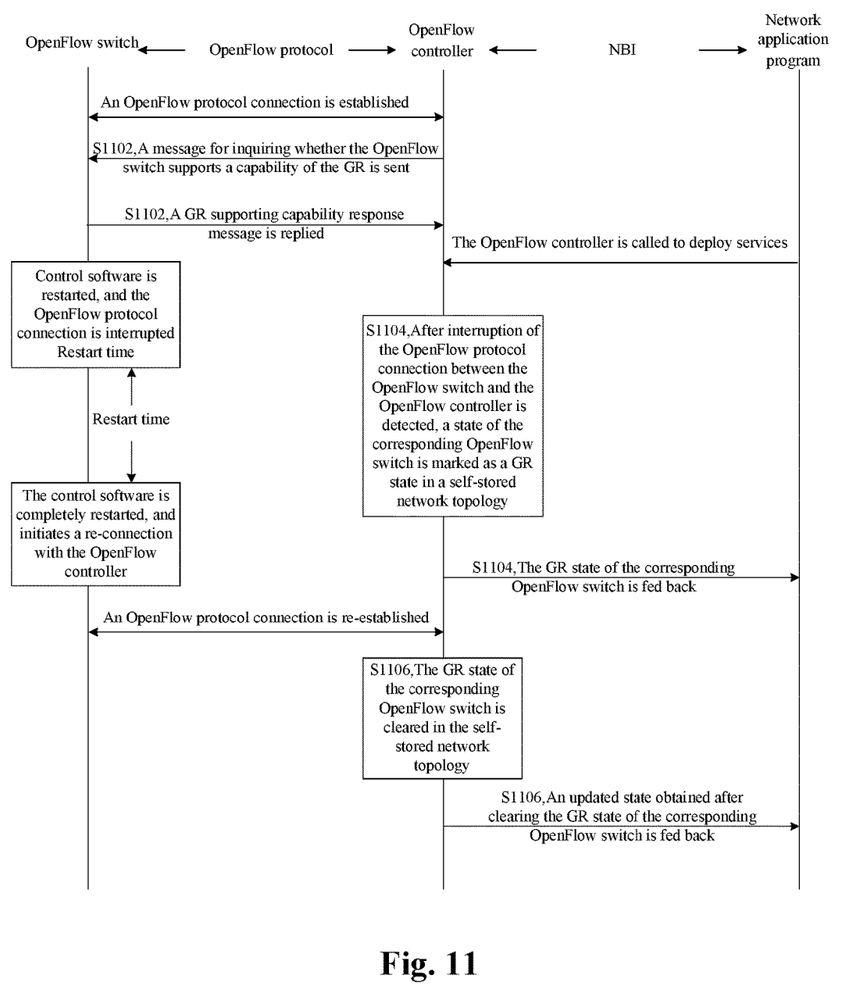
FIG. 11 is a flowchart of a second method for processing a GR of an OpenFlow switch according to an example embodiment of the present disclosure.

FIG. 11 is a flowchart of a second method for processing a GR of an OpenFlow switch according to an example embodiment of the present disclosure. As shown in FIG. 11, the flow includes the steps as follows.

Step S1102: Once an OpenFlow controller establishes an OpenFlow protocol connection with an OpenFlow switch, the OpenFlow controller will immediately send to the OpenFlow switch a message for inquiring whether the OpenFlow switch supports a capability of the GR, and the OpenFlow switch replies a GR supporting capability response message to the OpenFlow controller.

An OpenFlow protocol is run between the OpenFlow switch and the OpenFlow controller, the message for inquiring whether the OpenFlow switch supports the capability of the GR is an OpenFlow protocol message packaged using an existing OpenFlow protocol, the message is configured to inquire whether the OpenFlow switch supports the GR, and the message may be a newly defined OpenFlow protocol message or may be a new OpenFlow protocol message obtained by extending an existing OpenFlow protocol message.

The GR supporting capability response message is also an OpenFlow protocol message packaged using an existing OpenFlow protocol. When the OpenFlow switch sending the message supports GR, the message simultaneously carries a flag bit indicating that the OpenFlow switch supports GR, an identifier of the OpenFlow switch sending the message (an OpenFlow switch identifier (Datapath ID), namely a data path identifier, specified by an existing OpenFlow protocol may be adopted), and maximum time needed by restart, wherein the maximum time needed by restart is configured for the OpenFlow controller to judge whether the OpenFlow switch suffers from a restart fault, and is maximum waiting time within which the OpenFlow controller waits for the gracefully restarted OpenFlow switch to re-establish an OpenFlow protocol connection with the OpenFlow controller. When the OpenFlow switch sending the message does not support GR, the message simultaneously carries a flag bit indicating that the OpenFlow switch does not support GR, and an identifier of the OpenFlow switch sending the message. After receiving the message, the OpenFlow controller will delete the OpenFlow switch from the self-stored network topology according to the related art when the OpenFlow switch is in a restart state, thereby re-computing a route according to a new network topology and updating flow tables of all affected OpenFlow switches in a network.

It is assumed that the OpenFlow switch sending the GR supporting capability response message supports GR in the subsequent steps.

Step S1104: After detecting interruption of the OpenFlow protocol connection between the OpenFlow switch and the OpenFlow controller, the OpenFlow controller marks a state of the corresponding OpenFlow switch as a GR state in a self-stored network topology, and feeds back, via an NBI, the GR state of the corresponding OpenFlow switch to a network application program requiring to know the network topology.

Step S1106: After the OpenFlow switch is completely restarted and re-establishes an OpenFlow protocol connection with the OpenFlow controller, the OpenFlow controller clears the GR state of the corresponding OpenFlow switch in the self-stored network topology, and feeds back, via an NBI, an updated state obtained after clearing the GR state of the corresponding OpenFlow switch to the network application program requiring to know the network topology.

After the maximum time needed by restart, carried in the GR supporting capability response message replied to the OpenFlow controller by the OpenFlow switch, when the OpenFlow controller has not re-established an OpenFlow protocol connection with the OpenFlow switch yet, the OpenFlow controller will delete the OpenFlow switch from the self-stored network topology according to the related art, and will feed back an updated network topology to the network application program requiring to know the network topology.

First Example Implementation

Figure 12:
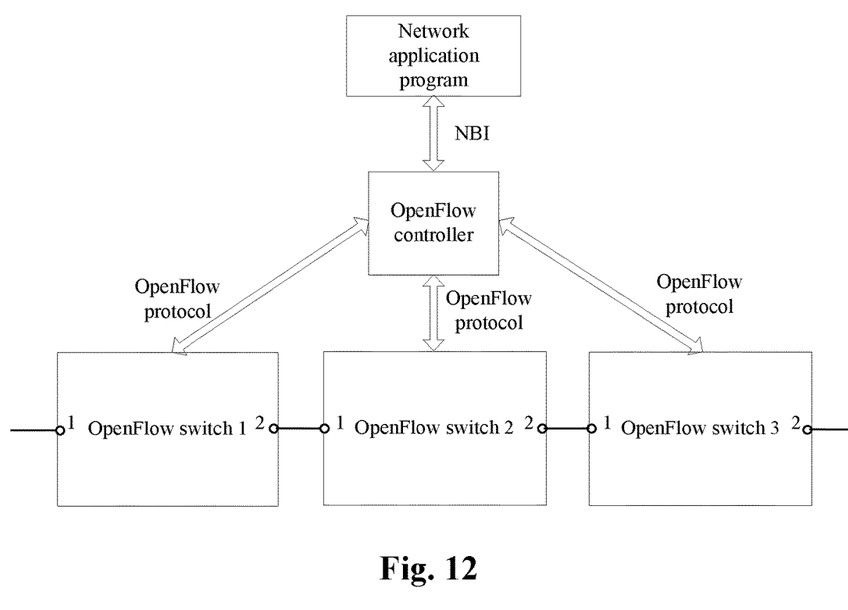
FIG. 12 is a diagram of an OpenFlow network scenario applying GR of an OpenFlow switch according to a first example implementation of the present disclosure.

FIG. 12 is a diagram of an OpenFlow network scenario applying GR of an OpenFlow switch according to a first example implementation of the present disclosure. As shown in FIG. 12, an OpenFlow network includes three OpenFlow switches and one OpenFlow controller, wherein the three OpenFlow switches have established OpenFlow protocol connections with the OpenFlow controller separately. The three OpenFlow switches are an OpenFlow switch 1, an OpenFlow switch 2 and an OpenFlow switch 3, a port 2 of the OpenFlow switch 1 is connected to a port 1 of the OpenFlow switch 2, and a port 2 of the OpenFlow switch 2 is connected to a port 1 of the OpenFlow switch 3. A network application program calls, via an NBI, a 50M-bandwidth Internet Protocol (IP) service connection which has been established between the port 1 of the OpenFlow switch 1 and the port 2 of the OpenFlow switch 3 by the OpenFlow controller.

Due to receiving of an instruction of a network operator, the OpenFlow switch 2 will perform a GR. With reference to FIG. 10 and FIG. 12, in the present example implementation, the OpenFlow switches and the OpenFlow controller in the OpenFlow network need to execute the steps as follows.

Step 1: After receiving a GR instruction of the network operator, the OpenFlow switch 2 sends a GR notification message to the OpenFlow controller.

Step 2: After receiving the GR notification message, the OpenFlow controller replies a GR notification receiving acknowledgement message to the OpenFlow switch 2, marks a state of the OpenFlow switch 2 as a GR state in a self-stored network topology, and feeds back, via an NBI, the GR state of the OpenFlow switch 2 to a network application program requiring to know the network topology.

In a restart process of the OpenFlow switch 2, a calling operation, by the network application program, a 50M-bandwidth IP service connection which has been established between the port 1 of the OpenFlow switch 1 and the port 2 of the OpenFlow switch 3 by the OpenFlow controller is not affected. However, in this case, the network application program is not able to modify the IP service connection, and is not able to establish a new service connection between the port 1 of the OpenFlow switch 1 and the port 2 of the OpenFlow switch 3.

Step 3: After the OpenFlow switch 2 is completely restarted and re-establishes an OpenFlow protocol connection with the OpenFlow controller, the OpenFlow controller clears the GR state of the OpenFlow switch 2 in the self-stored network topology, and feeds back, via an NBI, an updated state obtained after clearing the GR state of the OpenFlow switch 2 to the network application program requiring to know the network topology.

When receiving the updated state which is obtained after clearing the GR state of the OpenFlow switch 2 and fed back by the OpenFlow controller, the network application program is able to modify the 50M-bandwidth IP service connection which has been established between the port 1 of the OpenFlow switch 1 and the port 2 of the OpenFlow switch 3, and is able to establish a new service connection between the port 1 of the OpenFlow switch 1 and the port 2 of the OpenFlow switch 3.

Second Example Implementation

Figure 13:
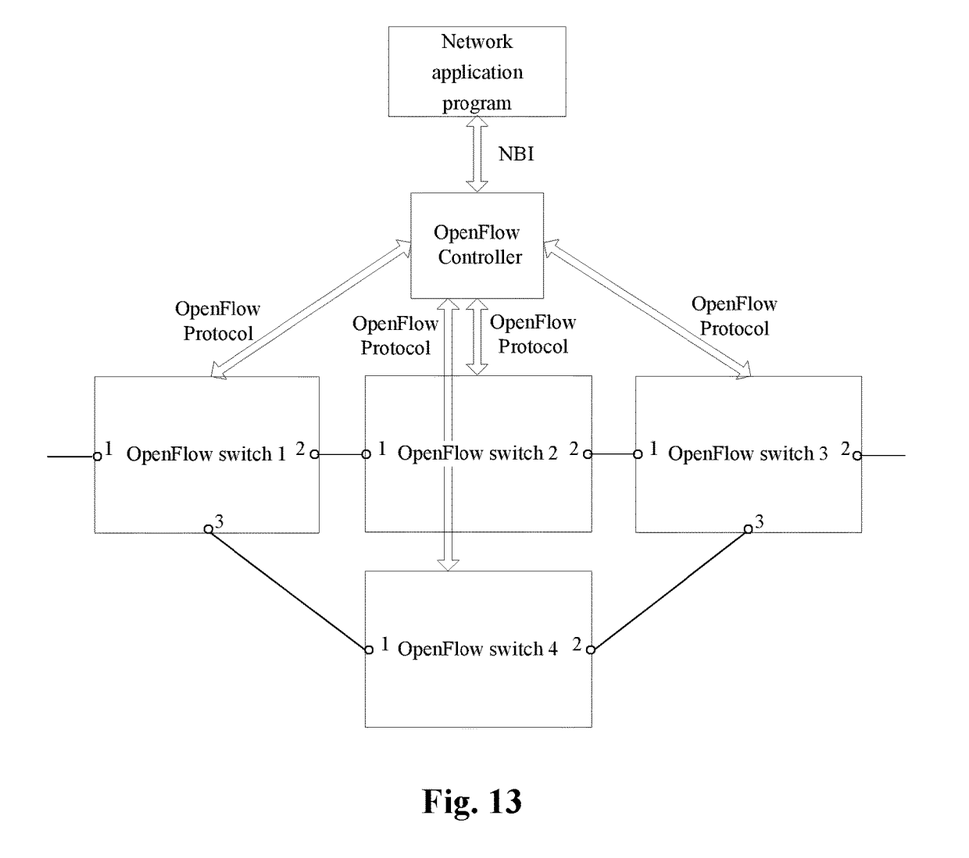
FIG. 13 is a diagram of an OpenFlow network scenario applying GR of an OpenFlow switch according to a second example implementation of the present disclosure.

FIG. 13 is a diagram of an OpenFlow network scenario applying GR of an OpenFlow switch according to a second example implementation of the present disclosure. As shown in FIG. 13, an OpenFlow network includes four OpenFlow switches and an OpenFlow controller, wherein the four OpenFlow switches have established OpenFlow protocol connections with the OpenFlow controller separately. The four OpenFlow switches are an OpenFlow switch 1, an OpenFlow switch 2, an OpenFlow switch 3 and an OpenFlow switch 4, a port 2 of the OpenFlow switch 1 is connected to a port 1 of the OpenFlow switch 2, a port 2 of the OpenFlow switch 2 is connected to a port 1 of the OpenFlow switch 3, a port 3 of the OpenFlow switch 1 is connected to a port 1 of the OpenFlow switch 4, and a port 3 of the OpenFlow switch 3 is connected to a port 2 of the OpenFlow switch 4. A network application program calls, via an NBI, a 50M-bandwidth IP service connection which has been established between the port 1 of the OpenFlow switch 1 and the port 2 of the OpenFlow switch 3 by the OpenFlow controller and passes through the OpenFlow switch 2.

Due to receiving of an instruction of a network operator, the OpenFlow switch 2 will perform a GR. With reference to FIG. 10 and FIG. 13, in the present example implementation, the OpenFlow switches and the OpenFlow controller in the OpenFlow network need to execute the steps as follows.

Step 1: After receiving a GR instruction of the network operator, the OpenFlow switch 2 sends a GR notification message to the OpenFlow controller.

Step 2: After receiving the GR notification message, the OpenFlow controller replies a GR notification receiving acknowledgement message to the OpenFlow switch 2, marks a state of the OpenFlow switch 2 as a GR state in a self-stored network topology, and feeds back, via an NBI, the GR state of the OpenFlow switch 2 to a network application program requiring to know the network topology.

In a restart process of the OpenFlow switch 2, a calling operation, by the network application program, a 50M-bandwidth IP service connection which has been established between the port 1 of the OpenFlow switch 1 and the port 2 of the OpenFlow switch 3 by the OpenFlow controller and passes through the OpenFlow switch 2 is not affected. However, in this case, the network application program is not able to modify the IP service connection. Because the OpenFlow switch 1 is able to be connected to the OpenFlow switch 3 via the OpenFlow switch 4. In this case, the network application program is able to establish a new service connection between the port 1 of the OpenFlow switch 1 and the port 2 of the OpenFlow switch 3. After receiving a call requested by the network application program to establish a new service connection, the OpenFlow controller will select to issue new flow tables to the OpenFlow switch 1, the OpenFlow switch 3 and the OpenFlow switch 4 according to the GR state of the OpenFlow switch 2, and establish a new service connection with the OpenFlow switch 4.

Step 3: After the OpenFlow switch 2 is completely restarted and re-establishes an OpenFlow protocol connection with the OpenFlow controller, the OpenFlow controller clears the GR state of the OpenFlow switch 2 in the self-stored network topology, and feeds back, via an NBI, an updated state obtained after clearing the GR state of the OpenFlow switch 2 to the network application program requiring to know the network topology.

When receiving the updated state which is obtained after clearing the GR state of the OpenFlow switch 2 and fed back by the OpenFlow controller, the network application program is able to modify the 50M-bandwidth IP service connection which has been established between the port 1 of the OpenFlow switch 1 and the port 2 of the OpenFlow switch 3 and passes through the OpenFlow switch 2, and is able to establish a new service connection between the port 1 of the OpenFlow switch 1 and the port 2 of the OpenFlow switch 3. After receiving a call requested by the network application program to establish a new service connection, in order to prevent the OpenFlow switch 2 from being repeatedly restarted due to a fault reason, the OpenFlow controller is able to select to issue new flow tables to the OpenFlow switch 1, the OpenFlow switch 3 and the OpenFlow switch 4 and establish a new service connection which passes through the OpenFlow switch 4, or is able to ignore the previous restart of the OpenFlow switch 2, select to issue new flow tables to the OpenFlow switch 1, the OpenFlow switch 2 and the OpenFlow switch 3 and establish a new service connection which passes through the OpenFlow switch 2.

Third Example Implementation

In the third example implementation, an OpenFlow network scenario is consistent with that in the first example implementation. Differently, the present example implementation adopts another method for implementing a GR of an OpenFlow switch provided by the present disclosure.

Due to receiving of an instruction of a network operator, an OpenFlow switch 2 will perform a GR. With reference to FIG. 11 and FIG. 12, in the third example implementation, OpenFlow switches and an OpenFlow controller in an OpenFlow network need to execute the steps as follows.

Step 1: Once the OpenFlow controller establishes an OpenFlow protocol connection with an OpenFlow switch 1, the OpenFlow switch 2 or an OpenFlow switch 3, the OpenFlow controller will immediately send a message for inquiring a ability of whether the OpenFlow switch supports a GR to each OpenFlow switch, each OpenFlow switch replies a GR supporting capability response message to the OpenFlow controller, and the OpenFlow switch 2 shows that it supports GR in the replied GR supporting capability response message.

Step 2: After the OpenFlow switch 2 is restarted, the OpenFlow controller detects interruption of the OpenFlow protocol connection between the OpenFlow controller and the OpenFlow switch 2; marks, accordingly, a state of the OpenFlow switch 2 as a GR state, and feeds back, via an NBI, the GR state of the OpenFlow switch 2 to a network application program requiring to know a network topology.

Step 3: After the OpenFlow switch 2 is completely restarted and re-establishes an OpenFlow protocol connection with the OpenFlow controller, the OpenFlow controller clears the GR state of the OpenFlow switch 2 in the self-stored network topology, and feeds back, via the NBI, an updated state obtained after clearing the GR state of the OpenFlow switch 2 to the network application program requiring to know the network topology.

Obviously, those skilled in the art shall understand that all modules or all steps in the present disclosure may be implemented using a general computing device, may be centralized on a single computing device or may be distributed on a network composed of a plurality of computing devices. Optionally, they may be implemented using executable program codes of the computing devices. Thus, they may be stored in a storage device and executed by the computing devices, the shown or described steps may be executed in a sequence different from this sequence under certain conditions, or they are manufactured into each integrated circuit component separately, or a plurality of components or steps therein are manufactured into a single integrated circuit component. Thus, the present disclosure is not limited to a combination of any specific hardware and software.

The above is only the example embodiments of the present disclosure, and is not intended to limit the present disclosure. There may be various modifications and variations in the present disclosure for those skilled in the art. Any modifications, equivalent replacements, improvements and the like within the spirit and principle of the present disclosure shall fall within the protective scope of the present disclosure.

Industrial Applicability

As above, by means of the embodiments and example implementations of the present disclosure, not only the problem in the related art that GR of an OpenFlow switch cannot be achieved is solved, but also the effect of effectively implementing the GR of the OpenFlow switch is achieved.

What is claimed is:

1. A method for processing a Graceful Restart (GR) of an OpenFlow switch, comprising:
   determining, by an OpenFlow controller, the OpenFlow switch being in a GR state; and
   marking, by the OpenFlow controller, a state of the OpenFlow switch as the GR state, wherein marking the state as the GR state comprises: keeping a flow table and external connection of the OpenFlow switch before the GR still valid, and prohibiting the flow table from being modified;
   wherein determining, by the OpenFlow controller, the OpenFlow switch being in the GR state comprises: sending, by the OpenFlow controller, when connecting with the OpenFlow switch, to the OpenFlow switch a message for inquiring whether the OpenFlow switch supports a capability of the GR; receiving, by the OpenFlow controller, a GR supporting capability response message fed back by the OpenFlow switch; and determining, by the OpenFlow controller, when disconnecting from the OpenFlow switch, the OpenFlow switch being in the GR state according to the received GR supporting capability response message;
   wherein after marking, by the OpenFlow controller, the state of the OpenFlow switch as the GR state, further comprising: detecting, by the OpenFlow controller, a re-connection with the OpenFlow switch; and clearing, by the OpenFlow controller, the GR state of the OpenFlow switch.

2. The method as claimed in claim 1, wherein after marking, by the OpenFlow controller, the state of the OpenFlow switch as the GR state, further comprising:
   feeding back, by the OpenFlow controller, the GR state of the OpenFlow switch to a network application program module requiring to know a network topology.

3. The method as claimed in claim 1, wherein after clearing, by the OpenFlow controller, the GR state of the OpenFlow switch, further comprising:
   feeding back, by the OpenFlow controller, an updated state obtained after clearing the GR state of the OpenFlow switch to the network application program module requiring to know the network topology.

4. A device for processing a Graceful Restart (GR) of an OpenFlow switch, comprising: a hardware processor, configured to perform programming components stored in a memory, wherein the programming components comprise:
- a determination component, configured to determine the OpenFlow switch being in a GR state; and
- a marking component, configured to mark the state of the OpenFlow switch as the GR state, wherein marking the state as the GR state comprises: keeping a flow table and external connection of the OpenFlow switch before the GR still valid, and prohibiting the flow table from being modified;
- wherein the determination component comprises: a sending element, configured to send, when connecting with the OpenFlow switch, to the OpenFlow switch a message for inquiring whether the OpenFlow switch supports a capability of the GR; a second receiving element, configured to receive a GR supporting capability response message fed back by the OpenFlow switch; and a second determination element, configured to determine, when disconnecting from the OpenFlow switch, the OpenFlow switch being in the GR state according to the received GR supporting capability response message;
- wherein the programming components further comprise: a detection component, configured to detect re-connection with the OpenFlow switch; and a clearing component, configured to clear the GR state of the OpenFlow switch.

5. The device as claimed in claim 4, wherein the programming components further comprise:
- a first feedback component, configured to feed back the GR state of the OpenFlow switch to a network application program module requiring to know a network topology.

6. An OpenFlow controller, comprising the device as claimed in claim 5.

7. The device as claimed in claim 4, wherein the programming components further comprise:
- a second feedback component, configured to feed back an updated state obtained after clearing the GR state of the OpenFlow switch to the network application program module requiring to know the network topology.

8. An OpenFlow controller, comprising the device as claimed in claim 7.

9. An OpenFlow controller, comprising the device as claimed in claim 4.

* * * * *